United States Patent
Wipert

(10) Patent No.: US 7,424,338 B1
(45) Date of Patent: Sep. 9, 2008

(54) BROKEN TOOL DETECTION SYSTEM

(75) Inventor: Bill Wipert, Paris, OH (US)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 11/695,193

(22) Filed: Apr. 2, 2007

(51) Int. Cl.
G06F 19/00 (2006.01)
G06F 11/30 (2006.01)

(52) U.S. Cl. .................................................... 700/175

(58) Field of Classification Search ......... 700/108–113, 700/159, 160, 174–178; 702/182–185; 83/62
See application file for complete search history.

(56) References Cited

U.S. PATENT DOCUMENTS

| | | | |
|---|---|---|---|
| 3,728,919 A | 4/1973 | Scott | |
| 4,180,356 A | 12/1979 | Hoch | |
| 4,249,243 A | 2/1981 | Yoshida et al. | |
| 4,420,685 A * | 12/1983 | Ohtani et al. | 250/222.2 |
| 4,426,177 A * | 1/1984 | Perry | 408/8 |
| 4,563,897 A | 1/1986 | Moore | |
| 4,636,779 A | 1/1987 | Thomas et al. | |
| 4,658,245 A | 4/1987 | Dye et al. | |
| 4,664,571 A | 5/1987 | Takada et al. | |
| 4,667,113 A * | 5/1987 | Nakajima et al. | 250/559.4 |
| 4,918,427 A * | 4/1990 | Thomas et al. | 340/680 |
| 5,119,006 A | 6/1992 | Torii et al. | |
| 5,857,166 A | 1/1999 | Kim | |
| 5,910,894 A * | 6/1999 | Pryor | 700/95 |
| 6,041,271 A * | 3/2000 | Lindstrom | 700/175 |
| 6,059,494 A * | 5/2000 | Susnjara | 409/134 |
| 6,230,079 B1 | 5/2001 | Brogardh et al. | |
| 6,479,960 B2 | 11/2002 | Nakai et al. | |
| 7,331,739 B2 * | 2/2008 | Yoshida et al. | 409/131 |
| 2005/0222705 A1 | 10/2005 | Budd | |

* cited by examiner

Primary Examiner—M. N. Von Buhr
(74) Attorney, Agent, or Firm—Rankin, Hill & Clark LLP; Vincent Ciamacco

(57) ABSTRACT

A system for detecting the presence of a broken tool in a manufacturing line uses a robot device separately positioned along the line. The robot unit has a plurality of probes which are inserted into openings in the item to detect the presence of a broken tool. The robot mounted detector replaces broken tool detectors mounted on index arms that support a plurality of gangheads that perform the machining operations on the item, allowing increased flexibility in the allocation and positioning of the gangheads, and providing more effective broken tool detection.

9 Claims, 3 Drawing Sheets

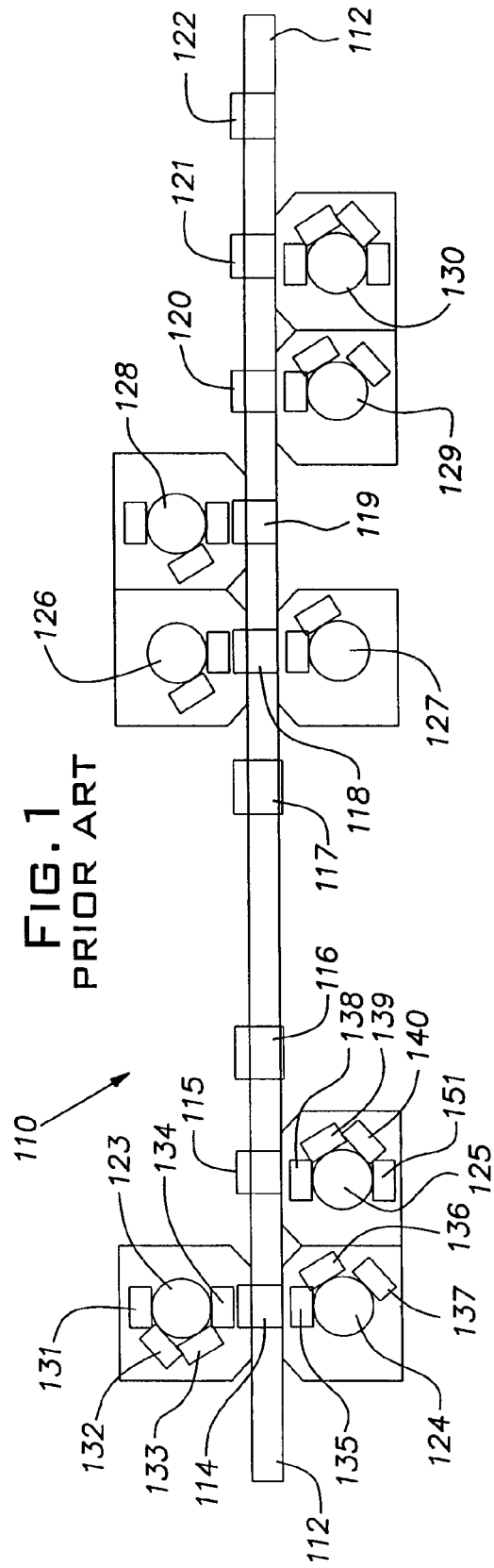
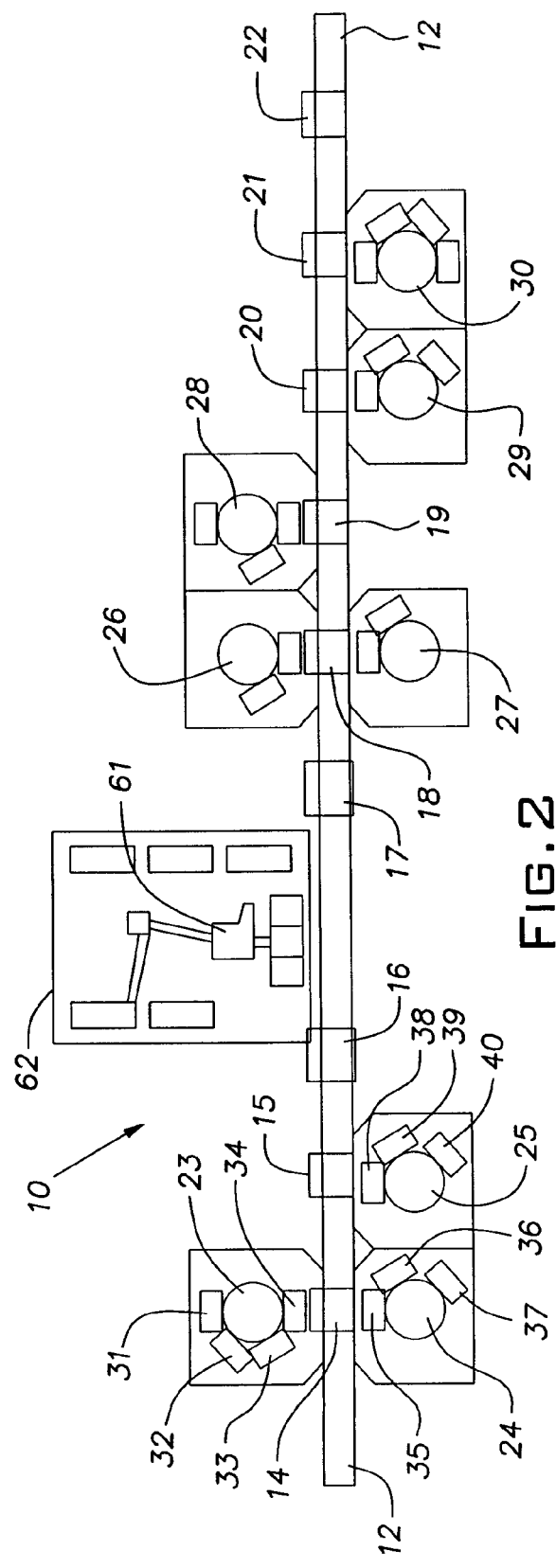

BROKEN TOOL DETECTION SYSTEM

BACKGROUND OF THE INVENTION

The present invention generally relates to manufacturing lines having a plurality of workstations for performing machining operations on workpieces, and in particular, to the detection of broken tools resulting from these operations.

DESCRIPTION OF THE RELATED ART

Manufacturing processes often employ a moving line of workpieces with a plurality of work stations along the line. At one or more of these stations, machining operations are performed on the workpieces. A rotating index arm is located at a workstation, and the index arm may have four or six positions, each of which is rotated into place to engage the workpiece. Gangheads are mounted on one or more of these positions, and each ganghead has multiple machine tools. These machine tools are rotated by the index arm into sequential engagement with the workpiece to perform machining tasks on the workpiece, such as drilling, tapping and reaming. Each index arm may have four or six gangheads, each performing different designated machining tasks.

A problem that is regularly encountered in the operation of these lines results when one of the tools breaks. The broken tool can fall into an opening on the workpiece, which would impair further work on workpiece. If the broken tool is not promptly detected, further operations on the workpiece may be spoiled and other machine tools can be damaged while attempting to perform subsequent tasks. Even if the broken tool is not retained in the hole, the improperly formed hole resulting from a broken tool needs to be detected and remedied.

A solution to this problem has been found by devoting one of the positions on the index arm to a broken tool detector. Using this technique, with a six position index arm, as many as five gangheads can be used in sequence to perform the predetermined machining operations on the workpiece. The sixth gang head would include a detector, and would then be rotated into place and moved to engage the workpiece and probe the holes just made on the workpiece for broken tools or improperly formed holes.

This technique is generally satisfactory, but it requires that one index arm position be devoted to broken tool detection, and this position must be provided after the previous cutting operations are completed. In many manufacturing lines, more than one workpiece configuration may be made, or it may be desirable to quickly change the line from one manufacturing one item to one manufacturing a different item. In such a situation, some of the gangheads may be used for one item, but not for another, and there may not be space to dedicate to the broken tool detector. Thus, in the prior art it would be necessary to install a machining center or work station with an additional index arm to permit a broken tool detector to be provided while still maintaining manufacturing flexibility. However, adding further work stations is expensive and undesirably extends the area necessary for machining operations. Accordingly, there exists a need in the art for a method and apparatus to detect a broken tool or an improperly formed hole.

SUMMARY OF THE INVENTION

The present invention provides an apparatus and method for performing broken tool detection on a manufacturing line that eliminates problems in properly locating the broken tool detector in the manufacturing process while greatly increasing flexibility in allocating index arm positions to other machining operations.

More specifically, the present invention removes the broken tool detector from an index arm position, freeing up this position for other machining operations, and allowing all of the index arms in the manufacturing line to be fully available for different machining operations. This is accomplished by re-locating the broken tool detector to a robotic unit dedicated to machine tool detection. The robot unit that performs the broken tool detection is located at a position along the manufacturing line that is encountered subsequent to the completion of all machining operations that make holes on the workpiece, so that there is no problem in allocating a position on an index arm for broken tool detection. Furthermore, the use of a robotic device for broken tool detection allows many advantages not available with conventional broken tool detectors. The robot mounted machine tool detector can be more sensitive than convention index arm mounted detectors and greater flexibility of movement can be achieved using a robot unit. Further, a robotic device is less expensive than adding an additional machining center, and is readily adaptable, by use for different customized gangheads, to various different workpieces that may be worked upon.

In further accordance with the present invention, a method for broken tool detector using a robotic unit mounted detector is provided.

BRIEF DESCRIPTION OF THE DRAWINGS

These and further features of the invention will be apparent with reference to the following description and drawings, wherein:

FIG. 1 is a schematic view of a prior art manufacturing line having a plurality of workstations for performing machining operations on a workpiece;

FIG. 2 is a schematic view similar to FIG. 1 showing a manufacturing line that includes the broken tool detection system of the present invention;

DETAILED DESCRIPTION OF THE PREFERRED EMBODIMENTS

Figure 3:
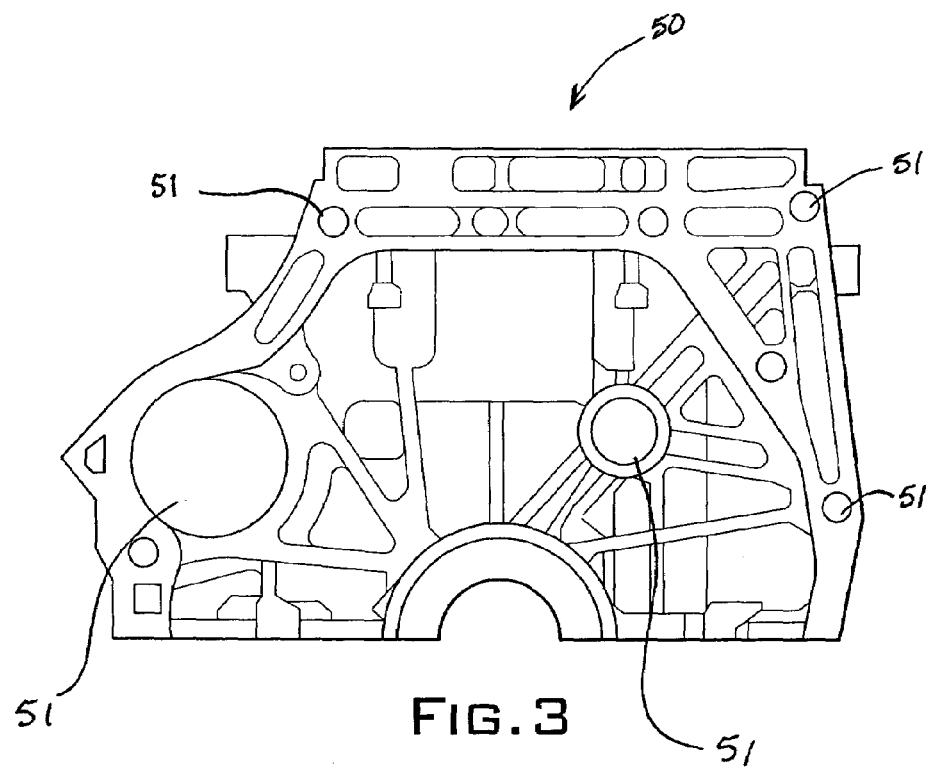
FIG. 3 is an schematic end elevational view of an engine or workpiece showing holes and openings formed therein.

The invention will now be described in accordance with its preferred embodiments. The description with reference to the figures is intended to simplify the explanation of the invention and is not meant to limit the scope of the invention.

With reference to FIG. 1, a manufacturing line operation 110 is shown for performing machining operations on a plurality of items or workpieces. The machining operation has a moving line 112 with a plurality of stations 114-121 located along the line. The workpieces are moved on pallets or other devices along the line 112 past the stations. At some or all of these stations, a designated operation is performed on the workpiece. The operation may include repositioning the workpiece, performing machining operations (e.g., cutting, grinding, drilling, tapping, reaming, etc.), and other operations (e.g., deburring). In order to perform the predetermined machining operations, at least one of the stations is provided with machining centers having multiple-position index arms, such as index arms 121-130. Each of the index arms has multiple (i.e., four or six) positions, and a ganghead is installed at some or all of these positions, such as gangheads 131-141. Each of the gangheads has multiple spindles or machining tools which perform a predetermined machining operation on the workpiece. These operations may include drilling, tapping or reaming. In operation, the index arm positions one of the gangheads adjacent to the line, the tools on the ganghead engage the workpiece, and the machining operations are performed. The index arm may then rotate to a different position, so that another ganghead is positioned adjacent to the line to perform further machining operations. When all of the machining operations are completed at one of the stations, the line moves the workpiece to the next station so that additional operations can be performed.

In accordance with typical prior art manufacturing line operation, one of the index arm positions is provided with a broken tool detector 151. After the machining operations have been completed using the tools on the gangheads, the broken tool detector probes are inserted into the holes formed by the previous operations to detect any broken tools that have fallen into the holes and any improperly formed holes. The conventional detector uses a spring and proximity detection mechanism to sense whether there are any foreign objects in the holes or if the holes are malformed. If a problem (broken tool/malformed hole) is detected, an appropriate signal is given to the line operator, who can then temporarily halt the line and inspect the workpiece.

It can be seen that it is possible that all of the index arm positions may be utilized in performing the necessary machining operations on the workpiece. In addition, when the manufacturing line is used to make differently configured items or when the line must be quickly changed to make different items, some of the index arm positions may be occupied by machine tools that may not be used at any given time for the workpiece being manufactured. In order to provide desired flexibility to the machine line, the index arm positions can easily be occupied by the many different tools required for machining the different workpieces.

With reference to FIG. 2, a manufacturing line operation 10 employing the broken tool detection system of the present invention is shown. As before, the operation includes a moving line 12 having a plurality of stations 14-21. At some of these stations, there are machining centers having four- or six-position index arms 21-29 again each having multiple gangheads 31-41, and each ganghead having multiple tools for performing cutting operations on the workpiece. However, unlike the prior art line of FIG. 1, none of the index arm positions is devoted to broken tool detection.

Instead, in accordance with the present invention, adjacent to one of the stations is installed a robot unit 61. The robot unit operates within a detection space 62. A series of interchangeable multiple-probe tooling plates 63 are provided in the detection space adjacent to the robot unit 61. The robot unit 61 picks up one of the tooling plates 63 that corresponds to the workpiece or engine 50 to be tested. For example, the engine 50, schematically depicted in FIG. 3, has a series of holes and openings 51 machined therein by the prior machining operations. For the tooling plate 63 adapted to this engine 50, the probes 64 will be arranged to correspond to the holes 51, both in location and length (depth). The robot 61 is controlled by a controller, which monitors the movement of workpieces 50 along the line 12, and instructed which of the tooling plates 63 to use to test the particular workpiece or engine 50 that moves into the detection space 62.

The robot unit 61 is programmed to move the tooling plate 63 into the desired position with respect to the workpiece 50, and insert the probes 64 into the holes and openings 51 formed in the previous machining operation. The robot unit 61, which is schematically illustrated, is preferably a six-axis robot, and suitable robot units are available from Fanuc Robotics and well known in the art.

Robot units may be provided with collision detection capabilities, by which the robot is programmed to stop further movement and provide a collision signal if it encounters an unexpected object during its operations. This capability is typically provided by monitoring robot motor current, wherein a spike in motor current being indicative of an obstacle being encountered, and is conventionally used for safety purposes (i.e., to prevent the robot unit from colliding with objects which unexpected enter its designated space). The robot may also be provided with capability of touch sensing for height, depth and width detection. These capabilities are preferably used by the robot unit 61 of the present invention for the purposes of detecting the broken tool or a malformed hole or opening 51.

Software may be supplied with the robot unit from the robot manufacturer to allow for touch sensing and collision detection and to provide the appropriate notification of a broken tool. In this case, the presence of a broken tool is indicated by spike in the load current. When this occurs, the robot unit will stop and an appropriate alert indication is given to the operator.

Various collision detection software to perform this function is available for robot units. One suitable software product is Collision Skip, sold by Fanuc Robotics for use with their robot units, and is well known by those skilled in the art.

In the operation of the broken tool detection system of the present invention in accordance with the method of the present invention, the unfinished workpieces are loaded onto conventional pallets or other carrying devices and move along the line 12. At the first station 14, the workpiece 50 is sequentially engaged by machine tools mounted on the gangheads 31-34 on the index arm 23 of the first machining center and by the machine tools mounted on the gangheads 35-37 on the index arm 24 of the second machining center. Thereafter, the workpiece moves to the next station 15, when it is engaged by the machine tools mounted on the gangheads 38-40 on the index arm 25 of the next machining center. The machining tools perform various machining operations on the workpiece including making holes and openings on the workpiece by drilling, tapping or reaming.

Figure 4:
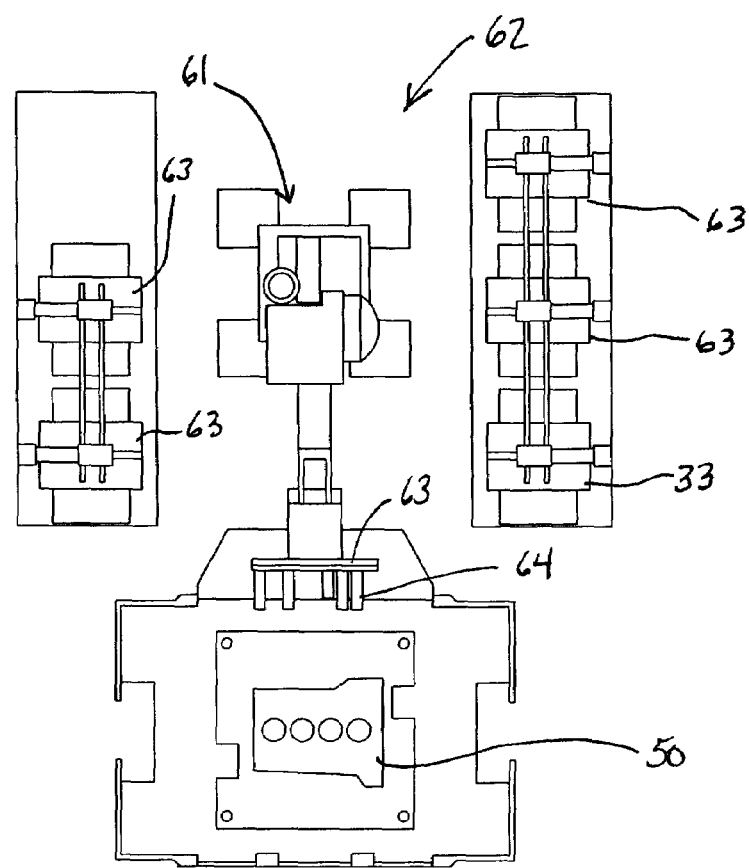
FIG. 4 is a top plan view of a detection space showing a robot and a series of tooling plates, and in which the robot is inserting probes of a tooling plate into holes formed in the engine or workpiece; and, FIG. 5 is side elevational view showing the robot inserting the probes into a workpiece.
Figure 5:
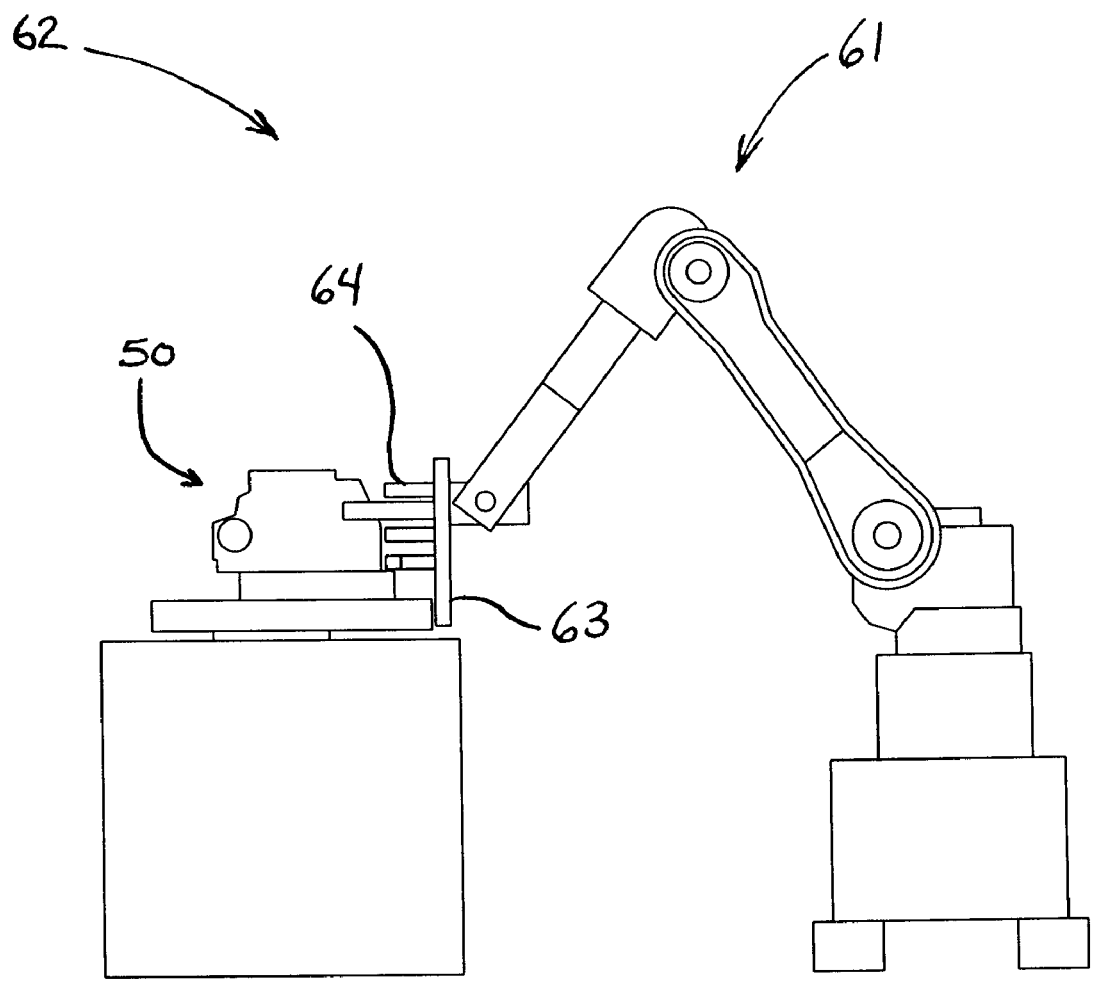

After these operations are completed, the workpiece 50 moves to the next station where a robot unit 61 picks up the tooling plate 63 corresponding to the workpiece 50, moves the tooling plate 63 toward the workpiece (FIGS. 4-5) in accordance with its pre-programmed movement, and inserts the probes 64 into the holes and openings 51 formed by the previous machining operations. If the probes 64 can be inserted fully into the holes and openings 51, the workpiece 50 passes inspection and continues to the other stations 18-21 where additional operations are performed.

If the probes 64 are unable to complete their complete programmed movement into the holes and openings 51 due the presence of a broken tool or any other defect, the touching sensing software of the robot unit detects this. The robot unit 61 then returns to its resting position, and a signal is sent to the line operator who can then temporarily halt line operation, retrieve the broken tool and/or inspect the workpiece 50 for defects. By detecting a problem early on, sequential manufacture of multiple defective workpieces 50 can be avoided.

It will be noted that robot unit 61 may be positioned at any convenient location along the line such that the broken tool detection is accomplished after the performance of the machining operations that may cause a broken tool to fall into a hole or opening. Some other machining operations that do not involve drilling, tapping or reaming may be performed after broken tool detection, since it is unlikely that these operations would result in a broken tool falling into any of the openings.

It will also be noted that the dedication of the robot unit to the broken tool detection allows all positions of the index arms 23-25 to be used for gangheads to perform various machining operations. This greatly increases the flexibility by which gangheads can be positioned, allows the line to be quickly changed to manufacture different items, and avoids the necessity of frequent changing of gangheads.

Further, by providing a dedicated detection space 62, with a robot unit 61 dedicated to hole inspection, the present invention permits multiple workpiece types or models to be sequentially manufactured. More specifically, the robot unit 61, by appropriate selection of the tooling plate 63 to be used in an inspection process, can test a number of different workpieces (engines) 50, thereby allowing a plurality of different workpieces (engines) 50 to be machined on the same line. By freeing up ganghead positions on the index arms, manufacturing flexibility is increased without sacrificing inspection capabilities, thereby improving the efficiency of the machining line without proportionally increasing infrastructure costs.

While the present invention has been described with particularity herein, it is considered apparent that the present invention is capable of numerous modifications, substitutions, and rearrangements of parts without departing from the scope and spirit of the present invention. Therefore, the invention is not to be limited to the particular preferred embodiments described hereinbefore, but rather only defined by the claims appended hereto.

What is claimed is:

1. A broken tool detection system for use in a manufacturing line for forming workpieces, wherein said system comprises:
    a line for moving the workpieces between a plurality of stations;
    a plurality of machining centers positioned along the line, each of the machining centers being adapted to perform machining operations on said workpieces so as to form holes in a predetermined pattern; and
    a robot unit positioned along the line downstream of at least one of the machining centers, the robot unit carrying a tooling plate having probes arranged so as to correspond to said predetermined pattern of holes such that, when said robot unit moves said tooling plate toward said workpiece, said robot unit senses a broken tool in the workpiece by engagement of said probes with the broken tool.

2. The broken tool detection system of claim 1, wherein each of the machining centers has an index arm for positioning a ganghead adjacent to a workpiece to perform the machining operations.

3. The broken tool detection system of claim 2, wherein each of the index arms has multiple positions, each position capable of supporting a ganghead, whereby a plurality of gangheads can be sequentially moved into position adjacent to workpiece to perform machining operations.

4. The broken tool detection system of claim 1, wherein the probes on the robot unit are positioned for insertion into the openings formed in the workpiece to detect the presence of broken tools.

5. The broken tool detection system of claim 1, further comprising a plurality of tooling plates arranged with said robot unit in a detection space, each of said tooling plates has an arrangement of probes that corresponds to a pattern of openings in a particular one of a plurality of workpieces, wherein said robot selects which of said plurality of tooling plates corresponds to the workpiece in said detection space, and inserts the probes of said selected tooling plate into said workpiece openings.

6. The broken tool detection system of claim 5, wherein each of the machining centers has an index arm for positioning a ganghead adjacent to a workpiece to perform the machining operations.

7. The broken tool detection system of claim 6, wherein each of the index arms has multiple positions, each position capable of supporting a ganghead, whereby a plurality of gangheads can be sequentially moved into position adjacent to workpiece to perform machining operations.

8. A method for manufacturing a workpiece that includes the detection of broken tools, wherein said method comprises the steps of:
    moving the workpiece along a manufacturing line between a plurality of stations;
    performing machining operations on the workpiece at the stations by engaging the workpiece with machine tools adjacent to the line so as to form holes in said workpiece; and
    after completion of the machining operations, detecting a presence of a broken tool in the workpiece by the steps of:
        moving the workpiece to a detection space, said detection space housing a robot unit and a plurality of tooling plates, each of the tooling plates having probes arranged in a pattern that corresponds to a particular workpiece hole pattern;
        selecting which of the plurality of tooling plates corresponds to the workpiece that is at the detection space;
        moving said selected tooling plate with the robot unit into engagement with the workpiece such that the tooling plate probes extend into said workpiece holes; and
    determining whether further inspection of the workpiece is necessary based upon whether the probes freely extend into said workpiece holes.

9. The method of claim 8, wherein the step of performing machining operations is performed by sequentially engaging the workpiece machine tools mounted on gangheads supported on index arms, each of the gangheads being moved by the index arm into position adjacent to the workpiece to perform the machining operations.

* * * * *